US008820403B2

(12) United States Patent
Streater, Jr. et al.

(10) Patent No.: US 8,820,403 B2
(45) Date of Patent: *Sep. 2, 2014

(54) HEAVY DUTY ROPE SOCKETS AND RELATED METHODS

(71) Applicant: National Oilwell Varco, L.P., Houston, TX (US)

(72) Inventors: James R. Streater, Jr., Humble, TX (US); Troy M. Hudson, Magnolia, TX (US); Michael S. Krauel, Houston, TX (US)

(73) Assignee: National Oilwell Varco, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/078,132

(22) Filed: Nov. 12, 2013

(65) Prior Publication Data

US 2014/0060817 A1    Mar. 6, 2014

Related U.S. Application Data

(63) Continuation of application No. 12/963,432, filed on Dec. 8, 2010, now Pat. No. 8,607,881.

(51) Int. Cl.
    *E21B 31/12*        (2006.01)
(52) U.S. Cl.
    USPC .................................................... 166/242.6
(58) Field of Classification Search
    USPC .................... 166/380, 242.6; 403/16, 367
    See application file for complete search history.

(56) References Cited

U.S. PATENT DOCUMENTS

| | | | |
|---|---|---|---|
| 1,429,371 A | 9/1922 | Shaffer | |
| 2,266,883 A | 12/1941 | Lukes et al. | |
| 2,984,881 A * | 5/1961 | Greer | 403/16 |
| 7,427,091 B2 | 9/2008 | Streater, Jr. et al. | |
| 7,431,077 B2 | 10/2008 | Streater, Jr. et al. | |
| 2004/0194809 A1 | 10/2004 | Crawford et al. | |
| 2007/0046051 A1 | 3/2007 | Streater, Jr. et al. | |

OTHER PUBLICATIONS

"Bowen Heavy Duty Cable Guided Fishing Assembly", Downhole Solutions, National Oil well, 2006, 4 pages.
"Slip Assembly, 1 11/16 O.D. "Reiiable," Slip Type Rope Socket", Bowen-Itco, Inc., Part No. 27677/010, Dwg. No. M-27677/010, Jan. 4, 1962, 1 page.
"1 3/4 O.D. Rope Socket Slip Carriage", Bowen-Itco, Inc., Part No. 13118/008, Dwg. No. L13118/008, Nov. 12, 1957, 1 page.
"Slip Type Rope Socket No. 2.5 Slip 15/32", Bowen-Itco, Inc., Part No. 13119/007X, Dwg. No. L-13119/007X, Jan. 3, 1985, 1 page.
"1 11/ 16 Rope Socket (Slip Type) Top Sub", Bowen-Itco, Inc., Part No. 15681/007, Dwg. No. L-1568/007, Mar. 25, 1986, 1 page.

(Continued)

*Primary Examiner* — William P Neuder
(74) *Attorney, Agent, or Firm* — Winston & Strawn LLP

(57) ABSTRACT

A rope socket comprises a slip cone subassembly having a straight outer diameter and a tapered inner diameter. A plurality of slips is positioned within the slip cone body. A retainer ring holds the slips together. A guide plug is positioned within the slips to maintain the slips in an opening position during insertion of a cable. A spring stabilizer having a spring thereon is coupled above the slip cone assembly to ensure even compression of the spring. A safety slot is located on the body of the rope socket in order to provide a visual indication of the cable position.

14 Claims, 6 Drawing Sheets

(56) References Cited

OTHER PUBLICATIONS

"1 11/ 16 O.D. Rope Socket Body for Slip Type Rope Socket", Bowen-Itco, Inc., Part No. 15682/005, Dwg. No. M-15682/005, 03126/1982, I page.

"1 11/ 16 O.D. Slip Type Rope Socket", Bowen-Itco, Inc., Part No. 15680, Dwg. No. M-15680, Jul. 12, 1960, 1 page.

"1 11/16 O.D. Rope Socket Slip Cone Remover", Bowen-Itco, Inc., Part No. 21136/005, Dwg. No. 21136/005, Sep. 14, 1960, I page.

ISO 9001:2000 Certified Product Catalog, Cooper Manufacturing & Supply, Inc., 62 pages.

* cited by examiner

HEAVY DUTY ROPE SOCKETS AND RELATED METHODS

CROSS REFERENCE TO RELATED APPLICATION

The present application is a continuation of U.S. patent application Ser. No. 12/963,432 filed on Dec. 8, 2010, the entire disclosure of which is hereby incorporated by reference.

FIELD OF THE INVENTION

The present invention relates generally to cable guided fishing assemblies and, more particularly, to rope sockets used in the assemblies to connect wireline during strip over operations.

BACKGROUND

During oil and gas operations, downhole tools become stuck occasionally and require expensive retrieval operations known as "fishing." Various reasons exist for the tool to become stuck, such as instances when the tool encounters a restriction that has formed in the inner diameter of the wellbore.

In situations when the stuck tool is still attached to an intact cable (e.g., wireline), a cable-guided fishing assembly is utilized. The Cable Guided Fishing Assembly is comprised of various components to ensure positive engagement of the stuck tool with the use of an overshot on a drill pipe. The heavy duty rope socket is used in the assembly to allow the cable to be cut and spliced during strip over operations.

There are disadvantages to conventional rope socket designs. Some designs employ a dual cast slip design having a set screw to hold a wireline in the slip carrier. However, the slips are line size specific and, because only two slips were used, non-uniform loading of the cable limits the pull load rating. Other designs utilized springs which sit directly atop the slips and can compress unevenly, resulting in unsecure coupling between the slips and the cable. In addition, the cable can sometimes become caught on the spring during insertion. Moreover, conventional designs provided no way to quickly ascertain whether the cable was engaged fully into the rope socket or whether the cable had slipped during operations.

In view of the foregoing, there is a need in the art for a heavy duty rope socket which addresses these and other concerns.

SUMMARY OF THE INVENTION

The present invention provides apparatuses and related methods for heavy duty rope sockets. A rope socket comprises a slip cone subassembly having a straight outer diameter and a tapered inner diameter. A plurality of slips are positioned within the tapered inner diameter of the slip cone body. A guide plug is positioned within the plurality of slips and retainer ring. The guide plug is adapted to maintain the slips in an opening position so that a cable may be inserted up past the slips without obstruction. A spring stabilizer having a spring thereon is coupled above the slip cone assembly in order to ensure even compression of the spring. A safety slot is located on the top sub of the rope socket in order to provide a visual indication of the fully engaged cable once it is inserted into the rope socket.

DESCRIPTION OF ILLUSTRATIVE EMBODIMENTS

Illustrative embodiments and related methodologies of the present invention are described below as they might be employed in a heavy duty rope socket. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the invention will become apparent from consideration of the following description and drawings.

Figure 1:
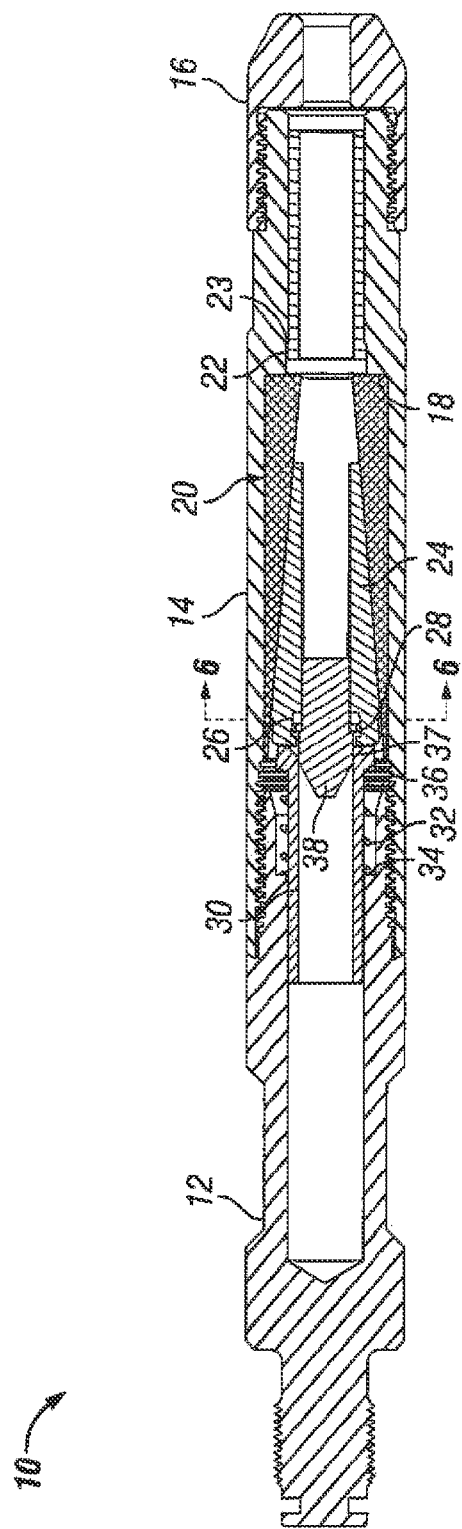
FIG. 1 is a sectional view of a heavy duty rope socket according to an exemplary embodiment of the present invention.

FIG. 1 illustrates a heavy duty rope socket according to an exemplary embodiment of the present invention. Rope socket 10 consist of a top sub 12 coupled to a body 14 via a threaded connection located at the lower end of top sub 12. A connector is located at the top of top sub 12 for connecting to other components used during fishing operations, as understood in the art. A cap 16 is threadedly connected to the lower end of body 14. Top sub 12, body 14, and cap 16 (i.e., the body of rope socket 10) each comprise internal bores therethrough which, once coupled together, form one continuous bore extending from the lower end of cap 16 up through body 14, and terminating at the upper end of top sub 12 as illustrated.

A slip cone 20 is located within the bore of body 14. Slip cone 20 is inserted inside body 14 and rests against a shoulder 18 located along the bore of body 14. As a result of shoulder 18, the portion of the bore of body 14 located below shoulder 18 is smaller in diameter than the bore portion located above shoulder 18. The bore of slip cone 20 is tapered along its entire length such that the diameter of the inner bore is smaller at the lower end of slip cone 20. The outer diameter of slip cone 20, however, is straight which allows for easy and efficient disassembly. In this exemplary embodiment, slip cone 20 is fully machined Aluminum and has a cylindrical outer diameter and a tapered inner diameter. Those of ordinary skill in the art having the benefit of this disclosure realize the specifications of the slip cone (e.g., taper angle, length, etc.) can be varied dependent upon the application.

Figure 6:
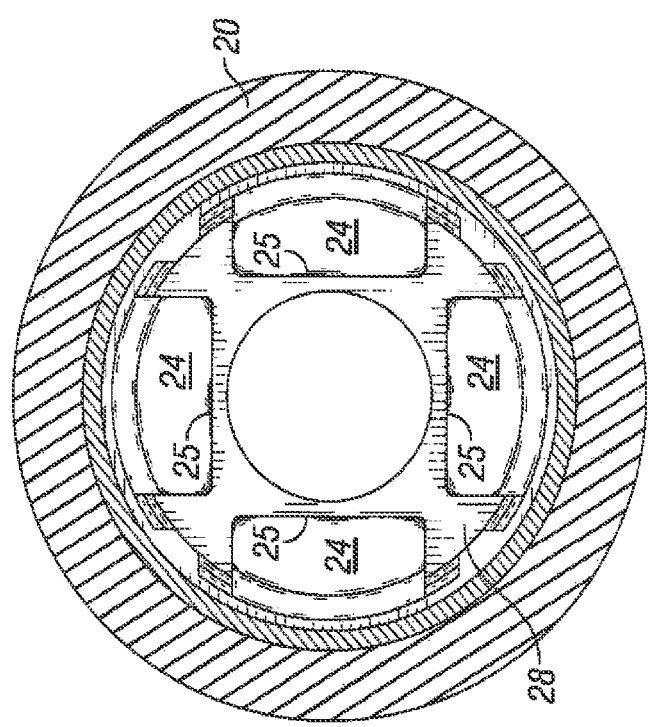
FIG. 6 is a sectional view along line 6-6 of FIG. 1 showing slips being held in place by the retaining ring.

Referring to FIGS. 1 & 6, four slips 24 are also positioned within the bore of slip cone 20 such that the outer surface of each slip mates with the inner surface of the tapered bore of slip cone 20. Although four slips are utilized in this embodiment, those ordinarily skilled in the art having the benefit of this disclosure realize more or less slips may be utilized. At the upper end of slips 24 are grooves 26 in which a retainer ring 28 is positioned. Slips 24 are placed inside a series of slots 25 on the outer diameter of retainer ring 28. Accordingly, retainer ring 28 is used to ensure slips 24 are equally positioned around the cable once it is inserted into rope socket 10.

An ejector 22 is located within the bore of body 14 below shoulder 18. At the upper end of ejector 22 is a shoulder 23 which rests atop a mating lip along the bore of body 14. In this exemplary embodiment, ejector 22 is made of 4140 steel and is the first component placed inside the inner diameter of body 14. The purpose of ejector 22 is to aid in the removal of the slip cone sub assembly after a job is run, which will be discussed later.

Figure 2:
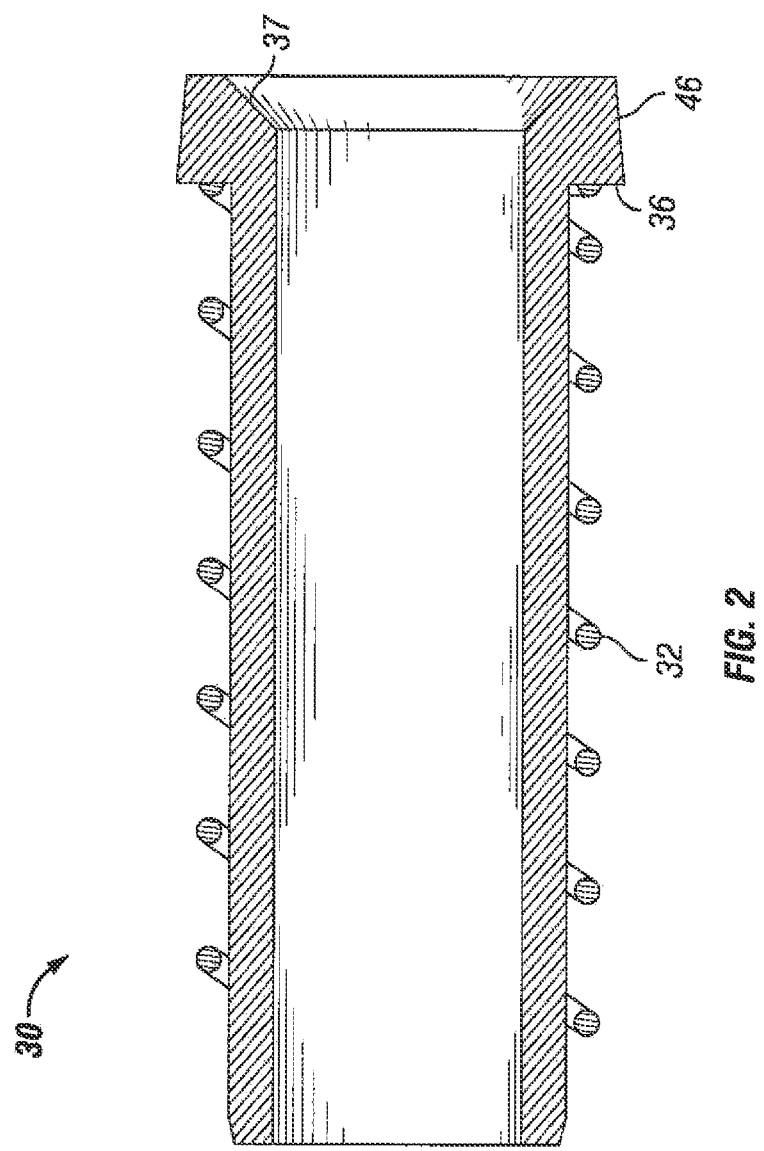
FIG. 2 is a sectional view of a spring stabilizer according to an exemplary embodiment of the present invention.

Further referring to the exemplary embodiment of FIG. 1 and FIG. 2, a spring stabilizer 30 is located above slip cone 20 within the bore of top sub 12, and is used to hold compression spring 32 in place under compression. The lower end of spring stabilizer 30 rests against the top end of slips 24. Compression spring 32 surrounds the outer diameter of spring stabilizer 30. The outer diameter of spring stabilizer 30 is sized to match the inner diameter of compression spring 32 in order to stabilize the spring under compression. Without spring stabilizer 30, compression spring 32 may compress unevenly resulting in misalignment of slips 24 once the cable has been inserted as will be described.

The upper end of compression spring 32 terminates at shoulder 34 (positioned along the bore of top sub 12), while the lower end terminates at shoulder 36 along the outer surface of spring stabilizer 30. Shoulder 36 prevents compression spring 32 from interfering with slips 24 and keeps compression spring 32 centrally aligned when top sub 12 is installed. Spring stabilizer 30 acts to stabilize and ensure that the downward force applied to slips 24 is applied equally to each slip 24. Accordingly, during operation, spring stabilizer 30 and retainer ring 28 act in tandem to ensure proper and efficient engagement of the cable.

Figure 3:
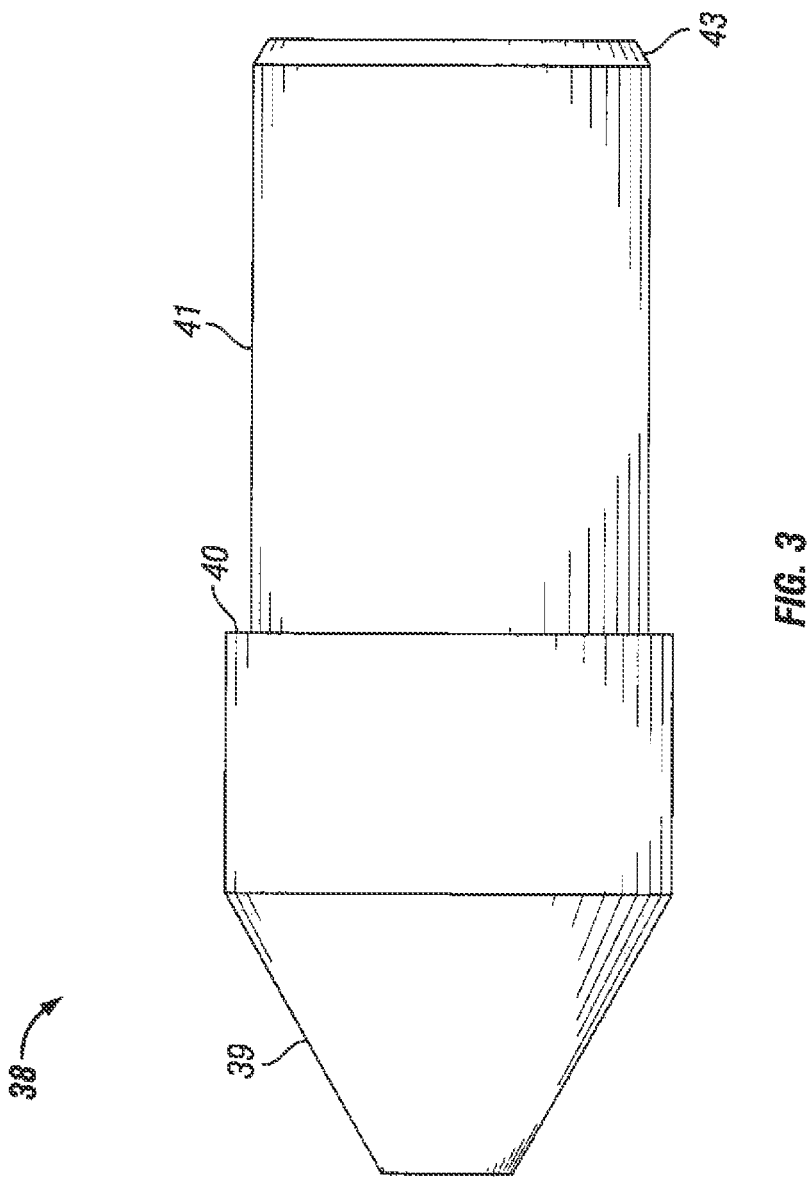
FIG. 3 is a two dimensional view of a guide plug according to an exemplary embodiment of the present invention.

Refining to the exemplary embodiments of FIGS. 1 & 3, a guide plug 38 is positioned within retainer ring 28 in order to ensure slips 24 remain open enough to allow the cable to pass up through slips 24 unobstructed. In addition, guide plug 38 assists in centralizing spring stabilizer 30 within the bore of top sub 12. Guide plug 38 comprises a cone shaped upper end 39 which terminates at a shoulder 40. Cone shaped upper end 39 assists guide plug 38 in moving through spring stabilizer 30. The lower shaft end 41 extends below shoulder 40 as illustrated. At the bottom of lower shaft end 41 is a tapered surface 43 which terminates with at the bottom of guide plug 38. Tapered surface 43 aids in insertion between the slips, and makes it less likely for the slip teeth to grab the angled edge. Lower shaft end 41 holds slips 24 open to allow the cable to pass slips 24 without becoming caught on the teeth (not shown) of slips 24. Shoulder 40 rests atop retainer ring 28, thereby allowing the lower end of guide plug 38 to extend down further along the inner surface of slips 24. Guide plug 38 is allowed to move upwardly along the bore of spring stabilizer 30, and even into the bore of top sub 12, but it is prevented from moving below retainer ring 28 due to shoulder 40.

An exemplary method of assembling the previously described embodiment will now be described. First, slips 24 are placed in the slots on the outer diameter of retainer ring 28, guide plug 38 is then placed in the center of retainer ring 28, and each is then placed in slip cone 20, creating a slip cone subassembly. Ejector 22 is then placed in the bore of body 14 below shoulder 18, followed by the slip cone subassembly being placed above shoulder 18, resting thereon as previously described. Compression spring 32 is then placed over the outer diameter of spring stabilizer 30 until it rests on shoulder 36. Spring stabilizer 30 is then placed over the extruding portion of guide plug 38. Top sub 12 is then screwed onto the box section of the body 14, and cap 16 is then screwed onto the pin section of body 14, thereby forming rope socket 10.

Figure 4:
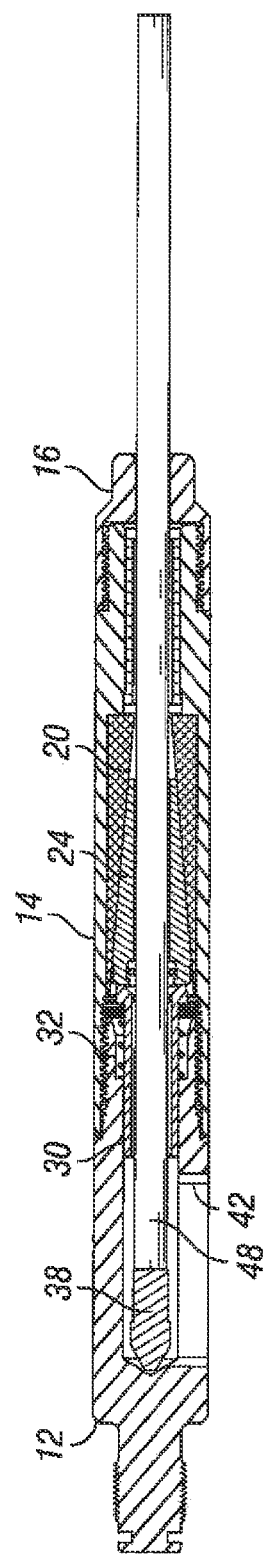
FIG. 4 is a sectional view of the heavy duty rope socket of FIG. 1, along line 4-4 of FIG. 5, having a cable inserted therein according to an exemplary embodiment of the present invention.

Referring to FIGS. 1 & 4, operation of this exemplary embodiment will now be described. When an operator desires to attach rope socket 10 to a cable 48 (e.g., wireline), cable 48 is pushed through the opening in cap 16, whereby it will pass through the bore of ejector 22. The cable 48 will then pass into the bore of slip cone 20 and pass slips 24, where cable 48 will then encounter the base of the guide plug 38. As previously described, shaft 41 of guide plug 38 ensures slips 24 remain open such that cable 48 passes up through slips 24 (and its teeth) without being obstructed. As cable 48 continues to be inserted, it will then push guide plug 38 upwards through the bore of spring stabilizer 30 and into the bore of top sub 12. At the lower end of spring stabilizer 30 surrounding the opening is a tapered face 37 (FIG. 2) which is provided to direct guide plug 38 and cable 38 through the spring stabilizer 30. In addition, surface 46 (FIG. 2) of spring stabilizer 30 is also tapered to match the angle of the inner diameter of slips 24 such that, during operation as spring stabilizer 30 is forced downward, spring stabilizer 30 and slips 24 mate with one another.

As guide plug 38 is forced up through the bore of spring stabilizer 30, slips 24 are no longer held in place by guide plug 38. The tension of compression spring 32 contains slips 24 within slip cone 20, thereby avoiding any chance of misalignment between slips 24 and the cable. In addition, the force of compression spring 32 acting on spring stabilizer 30 forces slips 24 downward, resulting in slips 24 being in direct contact with cable 48, as shown in FIG. 4. Spring stabilizer 30 ensures this downward force is applied evenly across all slips 24.

Figure 5:
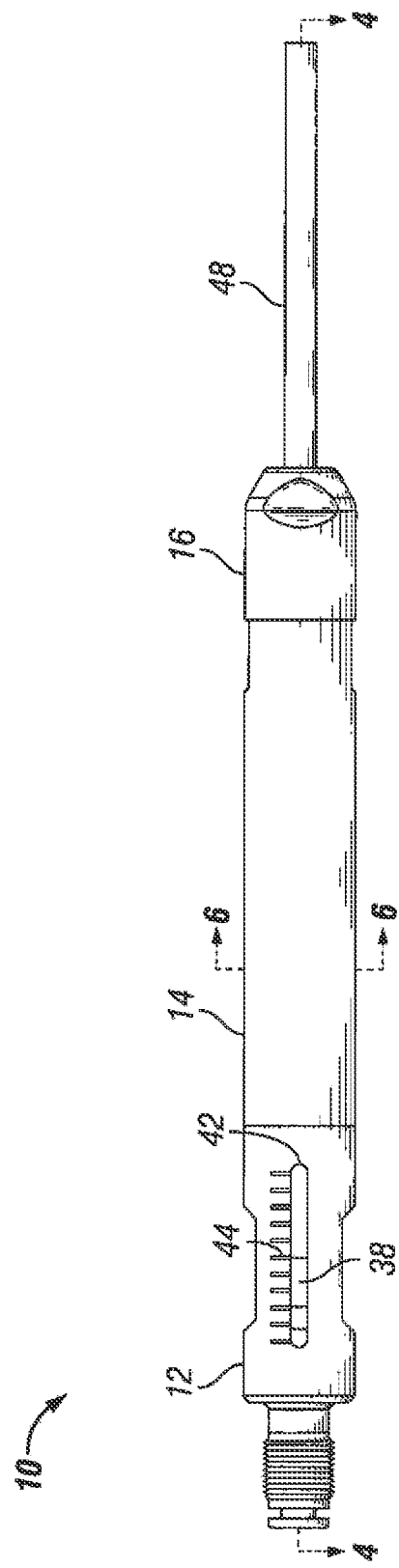
FIG. 5 is a three dimensional view of the heavy duty rope socket of FIG. 4.

As shown in FIG. 4, once cable 48 has been fully inserted into rope socket 10, guide plug 38 is located at the top end of the bore of rope socket 10. Referring to FIGS. 4 & 5, an opening, such as safety slot 42, and guide marks 44 are located along the body of top sub 12 adjacent the top end of top sub 12 in order to provide visual confirmation that cable 48 has been fully inserted. In addition, safety slot 42 provides visual confirmation that cable 48 is not slipping during operations. Although safety slot 42 is described herein as a slot, one of ordinary skill in the art having the benefit of this disclosure realizes there are a variety of openings which could be designed to provide such visual confirmation/indication. Once the cable is fully inserted, cable 48 is pulled and the teeth (not shown) on the inner diameter of slip cones 24 bite into the cable as the tension is applied, as understood the art. Thereafter, further operations may begin.

When disassembly of rope socket 10 is desired, top sub 12 and cap 16 are removed. Thereafter, an extractor tool, as known in the art, is threaded to the bottom of body 14, and the extractor mandrel is threaded into the inner diameter of the extractor tool. As the extractor is threaded further, it will push against the bottom of ejector 22. As ejector 22 is forced upwardly, it contacts the flat bottom face of slip cone 20, thereby forcing slip cone 20 up and out of body 14. In prior art designs, the extractor comprised a thin wall which, with excessive force on the bottom of the slip cone, could cause the extractor to flare out and, in turn, become stick within the bore of the body. In addition to the other advantages, the present invention also remedies these issues through the use of ejector 22 and slip cone 20. Because of the flat surfaces on the top of ejector 22 and the bottom of slip cone 20, there is no danger of the extraction tool becoming wedged during disassembly.

An exemplary embodiment of the present invention provides a rope socket comprising a body having a bore therein, the bore extending from an opening in a lower end of the body and terminating adjacent an upper end of the body; a slip cone subassembly positioned within the bore, the slip cone subassembly comprising a slip cone body having a tapered inner diameter; a plurality of slips positioned within the tapered inner diameter of the slip cone body; and a guide plug positioned within the plurality of slips, whereby the guide plug maintains the plurality of slips in an open position; a spring stabilizer positioned within the bore above the slip cone subassembly; and a spring positioned around the spring stabilizer. In another embodiment, the rope socket further comprises a safety slot adjacent the upper end of the body, the safety slot being an opening extending from an outer surface of the body to the bore. In yet another embodiment, the safety slot comprises one or more guide marks which provide an indication of a position of a cable inserted in the bore. In another embodiment, the rope socket further comprises an ejector positioned in the bore beneath the slip cone subassembly. In yet another, the spring stabilizer comprises a shoulder at a lower end of the spring stabilizer, the shoulder extending from an outer surface of the spring stabilizer, wherein a lower end of the spring rests atop the shoulder. In yet another exemplary embodiment, the guide plug is adapted to move along a portion of the bore above the slip cone subassembly.

Another exemplary embodiment of the present invention provides a rope socket comprising a body having a bore therein; and a slip cone subassembly positioned within the bore, the slip cone subassembly comprising a slip cone body; a plurality of slips positioned within the slip cone body; and a guide plug positioned within the plurality of slips. In another embodiment, the rope socket further comprising a spring stabilizer positioned within the bore above the slip cone subassembly; and a spring positioned around the spring stabilizer. In yet another embodiment, the slip cone body comprises a straight outer diameter and a tapered inner diameter. In another embodiment, the rope socket further comprises an opening along the body of the rope socket, the opening extending from an outer surface of the body to the bore. In yet another embodiment, the opening comprises one or more guide marks which provide an indication of a position of a cable inserted in the bore. In another, the rope socket further comprises an ejector positioned in the bore beneath the slip cone subassembly. In yet another embodiment, the spring stabilizer comprises a shoulder extending from an outer surface of the spring stabilizer, wherein a lower end of the spring rests atop the shoulder. In another embodiment, the rope socket further comprises a retainer ring having slots in which the plurality of slips are positioned.

Another exemplary embodiment of the present invention provides a rope socket comprising a body having a bore therein; a slip cone subassembly positioned within the bore, the slip cone subassembly comprising a slip cone body; and a plurality of slips positioned within the slip cone body; a spring stabilizer positioned within the bore above the slip cone subassembly; and a spring positioned around the spring stabilizer. In yet another embodiment, the rope socket further comprises a guide plug positioned within the plurality of slips. In another embodiment, the slip cone body comprises a straight outer diameter and a tapered inner diameter. In yet another embodiment, the rope socket further comprises an opening along the body of the rope socket, the opening extending from an outer surface of the body to the bore. In another embodiment, the opening comprises one or more guide marks which provide an indication of a position of a cable inserted in the bore. In another embodiment, the rope socket further comprises an ejector positioned in the bore beneath the slip cone subassembly. In yet another embodiment, the spring stabilizer comprises a shoulder extending from an outer surface of the spring stabilizer, wherein a lower end of the spring rests atop the shoulder. In yet another embodiment, the guide plug is adapted to hold the plurality of slips in an open position.

An exemplary methodology of the present invention provides a method of making a rope socket, the method comprising the steps of: (a) providing a rope socket body having a bore therein; and (b) providing a slip cone subassembly positioned within the bore, the slip cone subassembly comprising a slip cone body; a plurality of slips positioned within the slip cone body; and a guide plug positioned within the plurality of slips. In another methodology, the method further comprises the steps of providing a spring stabilizer positioned within the bore above the slip cone subassembly; and providing a spring positioned around the spring stabilizer. In yet another methodology, the method further comprises the step of providing an opening along the rope socket body, the opening extending from an outer surface of the rope socket body to the bore. In another methodology, the method further comprises the step of providing an ejector positioned in the bore beneath the slip cone subassembly.

Another exemplary methodology of the present invention provides a method for using a rope socket, the method comprises the steps of: (a) inserting a cable into the rope socket; (b) passing the cable through a slip cone subassembly comprising a plurality of slips and a guide plug positioned between the plurality of slips; contacting a bottom end of the guide plug with the cable; (d) forcing the guide plug up above the slip cone subassembly using the cable; (e) continuing to pass the cable up through the rope socket until the guide plug terminates at an upper end of the rope socket; and (f) performing further operations using the rope socket. In another methodology, the method further comprises the step of determining a position of the cable within the rope socket using an opening placed along the rope socket. In another methodology, step (b) further comprises the step of utilizing the guide plug to hold the plurality of slips in an open position. In yet another methodology, the method further comprises the step of utilizing an ejector positioned in the bore beneath the slip cone subassembly.

Although various embodiments and methodologies have been shown and described, the invention is not limited to such embodiments and methodologies and will be understood to include all modifications and variations as would be apparent to one skilled in the art. For example, some embodiments may contain a spring stabilizer and no guide plug, or vice versa. In addition, exemplary embodiments of the present invention can be designed to hold a variety of cable ranges (e.g., 7/16"-1/2") without any need to change or modify the associated parts. Therefore, it should be understood that the invention is not intended to be limited to the particular forms disclosed. Rather, the intention is to cover all modifications, equivalents and alternatives falling within the spirit and scope of the invention as defined by the appended claims.

What is claimed is:
1. A rope socket comprising:
   a body having a bore therein;
   a slip cone subassembly positioned within the bore, the slip cone subassembly comprising:
      a slip cone body;

a plurality of slips positioned within the slip cone body; and a guide plug positioned within the plurality of slips, whereby the guide plug maintains the plurality of slips in an open position and is adapted to move along a portion of the bore above the slip cone subassembly.

2. The rope socket of claim 1, further comprising a safety slot adjacent the upper end of the body, the safety slot being an opening extending from an outer surface of the body to the bore.

3. The rope socket of claim 2, wherein the safety slot comprises one or more guide marks which provide an indication of a position of a cable inserted in the bore.

4. The rope socket of claim 1, wherein the rope socket further comprises an ejector positioned in the bore beneath the slip cone subassembly.

5. The rope socket of claim 1, wherein the rope socket further comprises a spring stabilizer positioned within the bore above the slip cone subassembly and a spring positioned around the spring stabilizer.

6. The rope socket of claim 5, wherein the spring stabilizer comprises a shoulder at a lower end of the spring stabilizer, the shoulder extending from an outer surface of the spring stabilizer, wherein a lower end of the spring rests atop the shoulder.

7. The rope socket of claim 1, further comprising a retainer ring having slots in which the plurality of slips are positioned.

8. An improved rope socket comprising a body having a bore therein, a slip cone subassembly comprising a plurality of slips, wherein in the improvement comprises a guide plug positioned within the plurality of slips so as to maintain the plurality of slips in an open position, and wherein said guide plug is adapted to move along a portion of the bore above the slip cone subassembly.

9. The improved rope socket of claim 8, wherein the improvement further comprises a safety slot adjacent the upper end of the body, the safety slot being an opening extending from an outer surface of the body to the bore to provide visual indication of a cable inserted in the bore.

10. The improved rope socket of claim 8, wherein the improvement further comprises a spring stabilizer positioned within the bore above the slip cone subassembly and a spring positioned around the spring stabilizer.

11. An improved rope socket comprising a body having a bore therein and a slip cone subassembly comprising a plurality of slips, wherein in the improvement comprises a spring stabilizer positioned within the bore above the slip cone subassembly and a spring positioned around the spring stabilizer.

12. The rope socket of claim 11, wherein the rope socket further comprises a guide plug positioned within the plurality of slips.

13. The rope socket if claim 11, wherein the slip cone assembly further comprises a slip cone body comprising a straight outer diameter and a tapered inner diameter.

14. The improved rope socket of claim 11, wherein the improvement further comprises a safety slot adjacent the upper end of the body, the safety slot being an opening extending from an outer surface of the body to the bore to provide visual indication of a cable inserted in the bore.

* * * * *